J. H. DEAN.
SIFTER FOR FLOUR BINS.
APPLICATION FILED MAR. 27, 1920.

1,342,989.

Patented June 8, 1920.
3 SHEETS—SHEET 1.

J. H. DEAN.
SIFTER FOR FLOUR BINS.
APPLICATION FILED MAR. 27, 1920.

1,342,989.

Patented June 8, 1920.
3 SHEETS—SHEET 3.

Inventor:
James H. Dean
By Paul & Paul, Atty.

UNITED STATES PATENT OFFICE.

JAMES H. DEAN, OF CHICAGO, ILLINOIS.

SIFTER FOR FLOUR-BINS.

1,342,989.    Specification of Letters Patent.    Patented June 8, 1920.

Application filed March 27, 1920. Serial No. 369,302.

*To all whom it may concern:*

Be it known that I, JAMES H. DEAN, a citizen of the United States, residing at Chicago, in the county of Cook and State of Illinois, have invented certain new and useful Improvements in Sifters for Flour-Bins, of which the following is a specification.

This invention relates particularly to improvements in sifters for flour and similar substances and it is designed particularly as a household implement.

The objects I have in view are to provide a sifter of this character that can be used in connection with ordinary sheet metal flour bins and in which all of the mechanism of the device is suitably inclosed by the casing of the sifter mechanism leaving only the operating crank or handle extending outside of the wall of the sifter.

Another object of the invention is to provide a mechanism that can be readily detached from the bin with which it is designed to be used and in which the sifting basket may be taken out of the mechanism for removal of any adhering material or for emptying it of lumps of flour or other material taken up by the sifter.

The invention consists generally in the constructions and combinations hereinafter described and particularly pointed out in the claims.

In the accompanying drawings forming part of this specification Figure 1 is a side elevation of a flour sifter embodying my invention.

Figs. 5 and 6 are details of the operating mechanism, Fig. 6 being a vertical section on line 6, 6 of Fig. 5 looking in the direction of the arrows.

Figs. 7 and 8 an underside view and an elevation of the oscillating operating arm and its supporting stud or bracket.

In all of the drawings 1 represents a suitable flour bin, the lower portion of which has a conical wall with a large central opening at the bottom of the cone.

Figure 1:
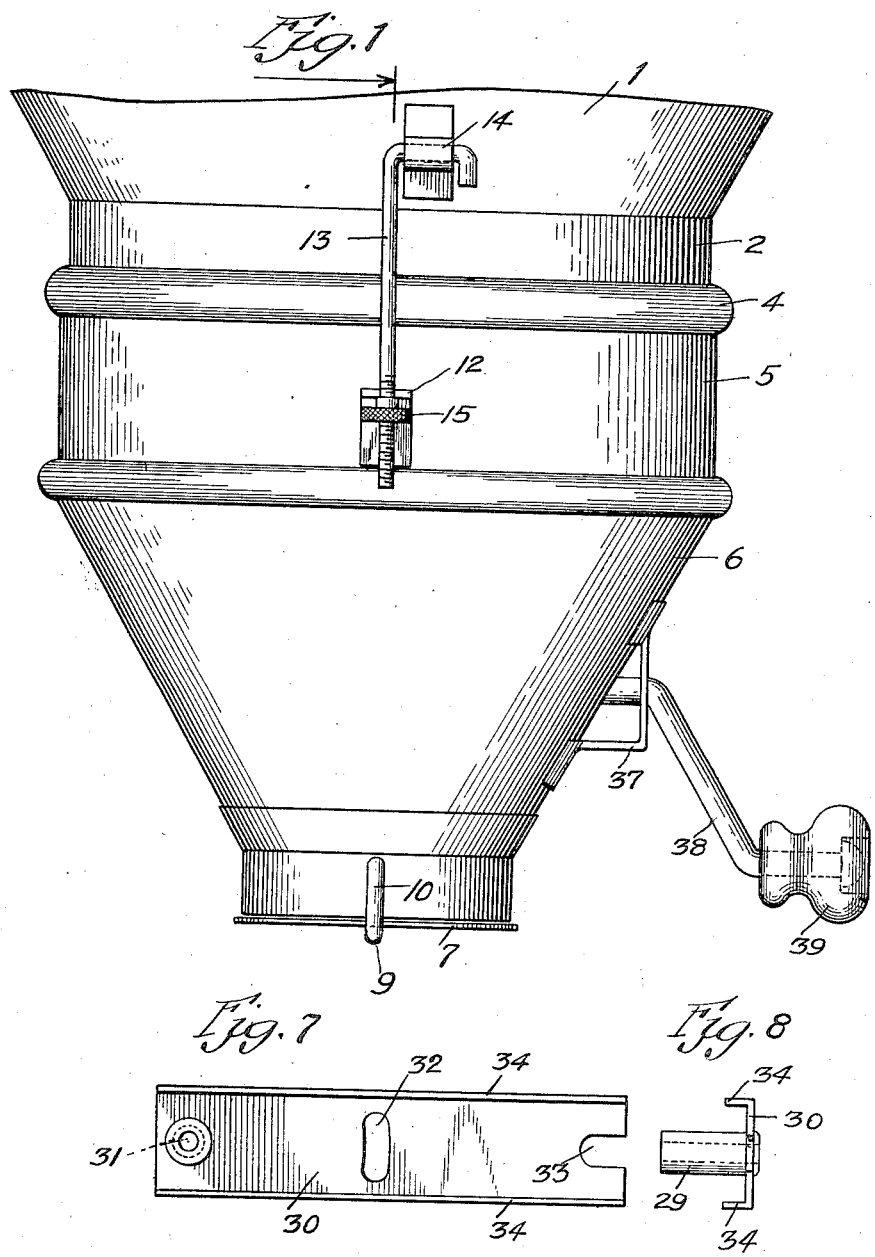
Figure 2:
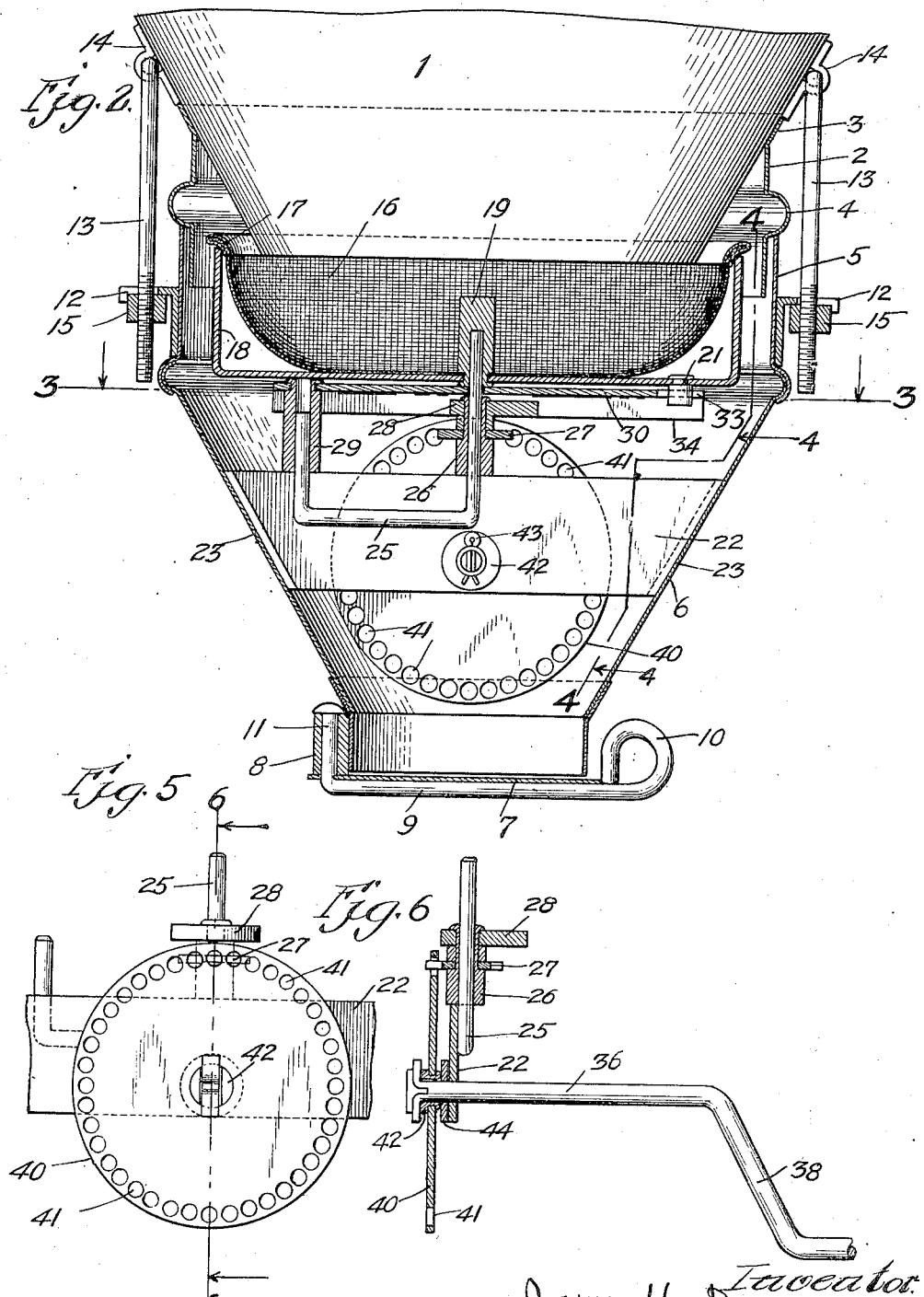
Fig. 2 is an elevation and partial section taken on a plane at right angles to the plane of Fig. 1 and looking in the direction of the arrows 2, 2.

I prefer to provide a downwardly extending cylinder 2 having its upper end preferably flared at 3 and secured to the outer wall of the conical lower portion of the bin as shown in Fig. 2 of the drawings and having preferably an open lower end with an outwardly extending bead 4 arranged about midway of the length of the cylinder (see Fig. 1).

The flour sifting casing preferably has the open upwardly extending cylindrical portion 5 to the lower end of which is pivotally joined a conical hopper portion 6 having at its lower end a swinging gate 7 pivoted to a support 8 that is carried by the lower end of the hopper the pivot being preferably provided by a rod 9 having an operating loop 10 at one end and an upwardly extending pivot portion 11 at the other end by which said plate is pivotally secured to the support 8.

The cylindrical portion 5 of the casing is preferably provided with the outwardly extending slotted lugs 12 adapted to receive the lower end of the screw-threaded supporting rods 13. The upper ends of these rods are preferably pivotally supported in the lugs 14 that are secured to the outer wall of the bin. These rods are adapted to swing into the slots in the lugs 12 and they are provided with the nuts 15 which may be screwed up against the under surfaces of the lugs 12 thereby locking the hopper in position as shown in Figs. 1 and 2 of the drawings. In this position the hopper is adapted to support all of the elements of the sifting device.

The main element of the sifting device is the wire cloth or screen basket 16 preferably having the folded over sheet metal binding 17 with a sheet metal strip 18 having its ends extending upwardly and suitably secured to the binding 17 at the upper edge of the basket. At the center of this supporting strip 18 I preferably arrange a head 19 the lower end of which is grooved and projected through an opening in the strip 18. The bottom of this head is upset as shown in Fig. 2 and the wire of the basket preferably extends into the recess formed in said head so that when the lower end of the head is upset the basket, the supporting strip 18, and the head 19 are all locked together and these parts become a unitary member of the device. When the basket is removed the supporting strip 18 forms a convenient handle or part by which the basket may be lifted and on which it is supported when the basket and the strip are placed upon a table or other suitable supporting device. Near one end the strip 18 is provided with a downwardly projecting lug 21 and the head 19 has an opening extending upward into it centrally.

Figure 3:
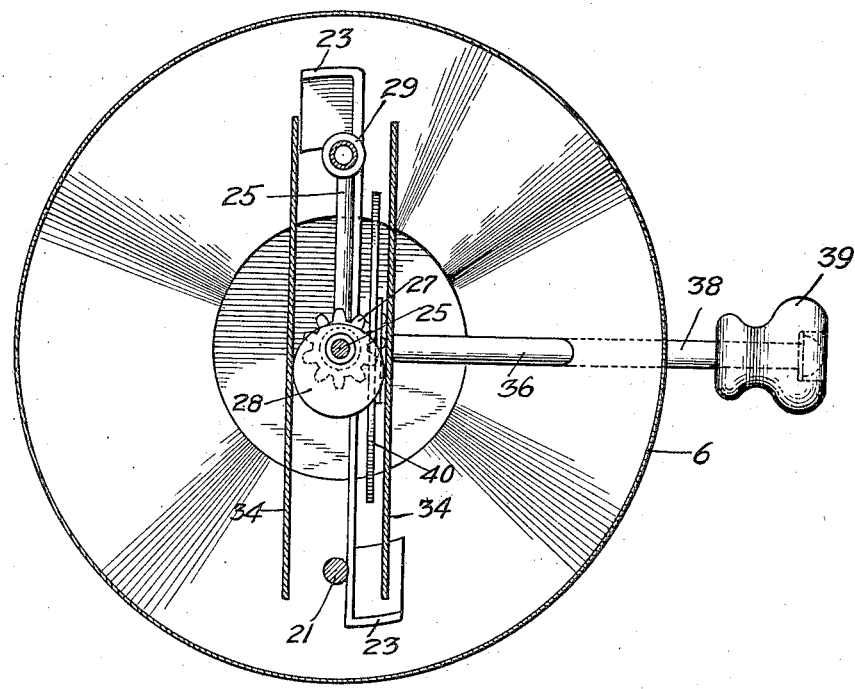
Fig. 3 is a horizontal plan section on line 3, 3 of Fig. 2.
Figure 4:
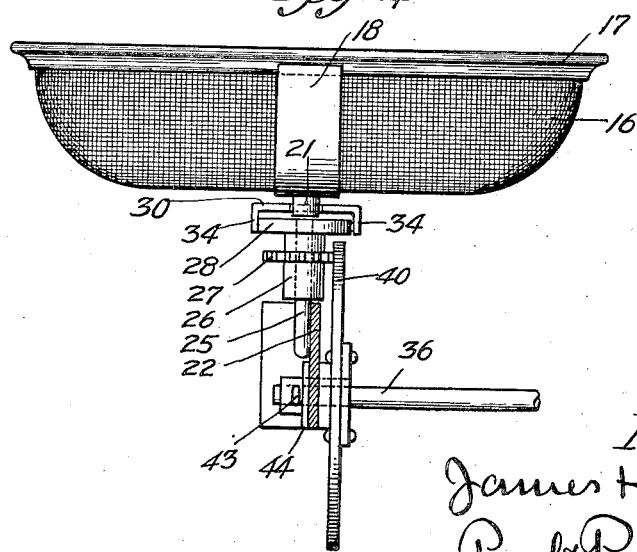
Fig. 4 is an elevation of the basket and a partial section on the irregular line 4, 4 of Fig. 2 looking in the direction of the arrow 4.

Extending across the interior of the hopper portion 6 of the casing is a vertically arranged plate 22 preferably having the laterally extending inclined ends 23 which bear against the inner wall of said hopper and are suitably secured thereto preferably by soldering. This plate and the supporting ends 23 are clearly shown in Fig. 2 and also in the plan section Fig. 3.

A U-shaped rod 25 is preferably secured to the plate 22 (see Fig. 2). This rod and plate may be secured together by spot welding although any other suitable means for securing the parts together may be employed.

The ends of the rod 25 both extend vertically as shown in Fig. 2 of the drawings and the upper end of the longer arm of the U projects into the opening in the lower end of the head 19 and forms the support for the basket 16, the plate 18, and said head 19, and also constitutes a pivot upon which said basket and the connected parts may be oscillated.

I also provide a cylindrical block 26 that is arranged and rotates upon the long arm of the rod 25 above the plate 22. This block has a reduced upper portion forming a support for a pinion 27 and an eccentric 28. The pinion, eccentric and supporting block are suitably secured together, and all of said parts rotate upon the upwardly extending end of the rod 25. The other or shorter arm of the rod 25 supports a block 29 the lower end of which may rest upon the top of the plate 22 (see Fig. 2). An oscillating arm 30 is pivotally supported upon the block 29. This arm is shown in detail in Figs. 7 and 8. The end of the block 29 extends through an opening 31 (see Fig. 7) near one end of the arm and is preferably upset or headed over as indicated in Fig. 2 of the drawing.

The arm 30 is provided with an elongated slot 32 through which the upwardly extending end of the rod 25 passes, said slot being of sufficient length to permit said arm to oscillate the desired amount upon its pivot formed by the block 29. The other end of the arm 30 is provided with slot 33 into which the stud 21 on the strip 18 projects. The arm 30 is preferably provided with the downwardly extending flanges 34 (see Figs. 7 and 8) and the eccentric 28 is located between these flanges (see Fig. 3).

I preferably provide a crank shaft 36 having one end supported in the plate 22. Said shaft also extends through the inclined wall of the hopper and through a bearing bracket 37 arranged upon the outside of the casing. The plate 22 and the bracket 37 provide bearings in which said shaft may be rotated by the crank 38 and knob or handle 39.

The inner end of the shaft 36 carries a disk 40 preferably provided near its periphery with a series of holes 41. This disk with the holes forms a driving gear for the pinion 27 the teeth of which project into said holes as shown in Figs. 2 and 6 of the drawing. The disk 40 is preferably provided with a hub 42 by which it is mounted upon the shaft 36. This hub and the disk may be secured upon the shaft by a suitable key 43 (see Fig. 2) or the end of the shaft may be split and turned back into a groove in the hub 42 as shown in Fig. 6 of the drawing. A washer 44 is preferably arranged between the end of the hub 42 and the plate 22.

It will be seen that the upper end or top of the basket 16 is of slightly greater diameter than the lower end of the conical portion of the bin 1 and extends somewhat above said lower end of said bin (see Fig. 2) so that the flour or other material in the bin passing into the basket and piling up therein has no tendency to overflow or work over the top of said basket.

The operation of the device will be readily understood from the foregoing detailed description. When it is desired to attach the sifter to the bin 1 the basket 16, the supporting strip 18, and the head 19 are put in position by setting the head over the upper end of the rod 25 and having the lug 21 project into the slot 33 in the operating arm 34. The sifter is secured in position on the bin by means of the rods 13 and the nuts 15. The device is then ready for operation. By turning the crank shaft 36 the basket is rapidly oscillated from the eccentric 28 through the oscillating arm 30, by reason of the engagement of said eccentric 28 with the flanges 34 on the oscillating arm 30.

The device is always ready for use. Whenever desired it may be removed from the bin and any lumps or foreign material taken out of the flour may be emptied out of the basket 16.

I do not limit myself to the details of the construction as the same may be varied in many particulars without departing from my invention.

I claim as my invention:

1. The combination, in a device of the class described, with a bin or receptacle having a conical lower portion, with an opening at the bottom thereof, and having an auxiliary cylindrical wall depending from the outer surface of said conical lower portion, and provided with an annular bead or projection, of a sifter casing having an open cylindrical upper end arranged to engage said bead, sifter mechanism arranged within said casing, and means for adjustably locking said sifter casing in position with the upper edge of its wall in contact with said head.

2. The combination with a bin, and a sifter casing provided with means for suspending the same beneath the lower end of said bin, of a sifter basket having a horizontal supporting strip and a centrally arranged head, a horizontally oscillating arm arranged beneath said strip, means connecting the free end of said arm with said basket supporting strip, and means for oscillating said arm and basket.

3. The combination, in a device of the class described, with a hopper shaped sifter casing, and means for suspending the same beneath a bin or receptacle having an open lower end, of a sifter basket centrally arranged in the upper portion of said casing, a supporting plate extending transversely in said casing with its ends secured to the inner surface of the hopper wall, a horizontally extending oscillating bar arranged below said basket and provided with depending flanges, a centrally arranged pivot secured upon said supporting plate and forming an axis for oscillation of said basket, a second vertically extending pivot secured upon said plate near one side of the hopper and forming a center of oscillation for said oscillating bar, means connecting the free end of said oscillating bar with said basket, an eccentric arranged between the depending flanges of said bar and means operated from the outside of said casing for rotating said eccentric and thereby oscillating said basket upon its center.

4. The combination, in a device of the class described, with a hopper shaped sifter casing, of a sifter basket centrally arranged in the upper portion of said casing, a transversely extending supporting plate arranged in said casing, a horizontally extending oscillating bar arranged below said basket, means connecting the free end of said bar with said basket, and means supported upon said plate for oscillating said bar.

5. The combination, in a device of the class described, with a casing, of a sifter basket centrally arranged in said casing, an eccentric rotatably supported in a horizontal plane below said basket, means actuated from outside of said casing to rotate said eccentric, a pivoted bar arranged below and independent of said basket, means connecting the free end of said bar with said basket and means provided on said bar engaging said eccentric.

6. The combination, in a device of the class described, with a casing, of a sifter basket centrally arranged in said casing and mounted upon a vertical pivot, an eccentric rotatably supported in a horizontal plane, below said basket, means actuated from outside said casing to drive said eccentric, and a pivoted bar arranged below and independent of said basket and connected with and driven by said eccentric for oscillating said basket upon its vertical pivot.

7. A sifting device comprising a receptacle, a sifting basket mounted therein to oscillate about a vertical axis, an actuator in said receptacle to rotate about a vertical axis and having an eccentric member connected to said basket, a horizontal drive shaft extending into said receptacle and connecting said shaft and said actuator.

In witness whereof, I have hereunto set my hand this 12th day of March, 1920.

JAMES H. DEAN.